235-379 SR

3/9/82 OR 4,319,132

United States Patent [19]

Guibord et al.

[11] 4,319,132

[45] Mar. 9, 1982

[54] PURGE CONTROL FOR AUTOMATIC NOTE DISPENSER

[75] Inventors: Ronald D. Guibord, Boylston; Neil W. Harman; Richard E. Hennessy, both of Marlborough, all of Mass.

[73] Assignee: Honeywell Information Systems Inc., Waltham, Mass.

[21] Appl. No.: 103,688

[22] Filed: Dec. 14, 1979

[51] Int. Cl.[3] .......................... G07F 7/10; G06F 7/00; G06K 17/00

[52] U.S. Cl. ...................................... 235/379; 221/13; 194/4 R

[58] Field of Search ............. 235/379, 92 SB; 221/13; 209/534; 194/8, 16, 4, 59, 71, DIG. 26; 271/263; 133/4

[56] References Cited

U.S. PATENT DOCUMENTS

| | | | |
|---|---|---|---|
| 3,611,293 | 10/1971 | Constable et al. | 340/149 A |
| 3,675,816 | 7/1972 | Bourke et al. | 221/13 |
| 3,685,690 | 8/1972 | Karecki et al. | 194/4 R |
| 3,778,595 | 12/1973 | Hatanaka et al. | 340/149 A |
| 3,934,693 | 1/1976 | Ooyama et al. | 194/4 R |
| 3,937,925 | 2/1976 | Boothroyd | 235/379 |
| 3,982,103 | 9/1976 | Goldman | 340/149 A |
| 4,066,253 | 1/1978 | Lundbald et al. | 194/4 R |
| 4,075,460 | 2/1978 | Gorgens | 340/149 A |
| 4,134,537 | 1/1979 | Glaser et al. | 235/379 |

*Primary Examiner*—Donald J. Yusko
*Attorney, Agent, or Firm*—Nicholas Prasinos; Gerald E. Lester

[57] ABSTRACT

An automatic purge control for a banknote dispensing system including an operator panel having a keyboard for initiating transaction requests, a dispensing chamber adjacent to the panel for receiving banknotes dispensed in response to an operator request, a lockable access door to enable the operator to gain access to the chamber to remove dispensed notes, and a tiltable platform positioned within the chamber for discharging dispensed notes from the chamber under predetermined purge conditions detected by a microprocessor within the system. The microprocessor calls for a purge operation when it has been determined that the operator has either failed to remove dispensed notes or has left notes within the chamber. Interlocks are provided on the purge apparatus for inhibiting continued operation of the dispensing system if a purge cycle is improperly executed.

12 Claims, 6 Drawing Figures

PURGE CONTROL FOR AUTOMATIC NOTE DISPENSER

FIELD OF THE INVENTION

This invention pertains to automatic dispensing systems for banknotes, cash, checks, stamps, tickets, and the like and more particularly, to a purge control for an automatic note dispensing system wherein dispensed notes can be automatically recovered in the event of a system or operator error.

BACKGROUND OF THE INVENTION

In banking systems such as that disclosed in our co-pending application Ser. No. 103,655, filed Dec. 14, 1979 wherein a purge apparatus is provided for recovering dispensed notes from a dispensing chamber in the event of system or operator error, it is desirable that the purge apparatus be reliable and tamper-proof to minimize the possibility of customers receiving unauthorized amounts of cash or from obtaining entry to the system through the purge apparatus.

OBJECTS AND SUMMARY OF THE INVENTION

Accordingly, it is an object of the present invention to provide an improved purge apparatus for a cash or note dispensing system. As used herein the word "note" is intended to refer not only to bills or banknotes, but also to other negotiable type documents such as checks, airline tickets, food stamps, and the like.

A further object is to provide an improved purge control of the type described wherein interlock functions are incorporated to inhibit continued operation of the system, or otherwise declare an error condition, in the event that an improper purge is performed.

To achieve the foregoing objects and in accordance with a first aspect of the invention, a purge control apparatus is provided for a note dispensing system having means for dispensing a note into a dispensing chamber and operator-actuatable access means for permitting an operator to gain access to the chamber to remove the note, the apparatus including means for disabling the access means to prevent actuation thereof, whereby the operator is denied access to the chamber, means for discharging the note from the chamber after the access means is disabled, note sensing means for sensing the presence of a note in the chamber, and control means responsive to the note sensing means after the operation of the discharging means to provide a purge complete indication if the note sensing means does not indicate the presence of a note in the chamber.

In accordance with another aspect of the invention, a purge control apparatus is provided for a note dispensing system having means for dispensing a note into a dispensing chamber, the apparatus including movable platform means within the chamber for receiving a dispensed note, means for moving the platform to discharge the note from the chamber in response to a purge signal from the system and for restoring the platform to its initial position, sensing means for sensing the position of the platform and for providing a return indication when the platform has been restored to its initial position, and means responsive to the sensing means for inhibiting further operation of the dispensing means until the return indication is provided.

The accompanying drawings which are incorporated in and constitute a part of this specification, illustrate a preferred embodiment of the invention and together with a description serve to explain the principles of the invention.

DETAILED DESCRIPTION OF EMBODIMENT

Figure 1:
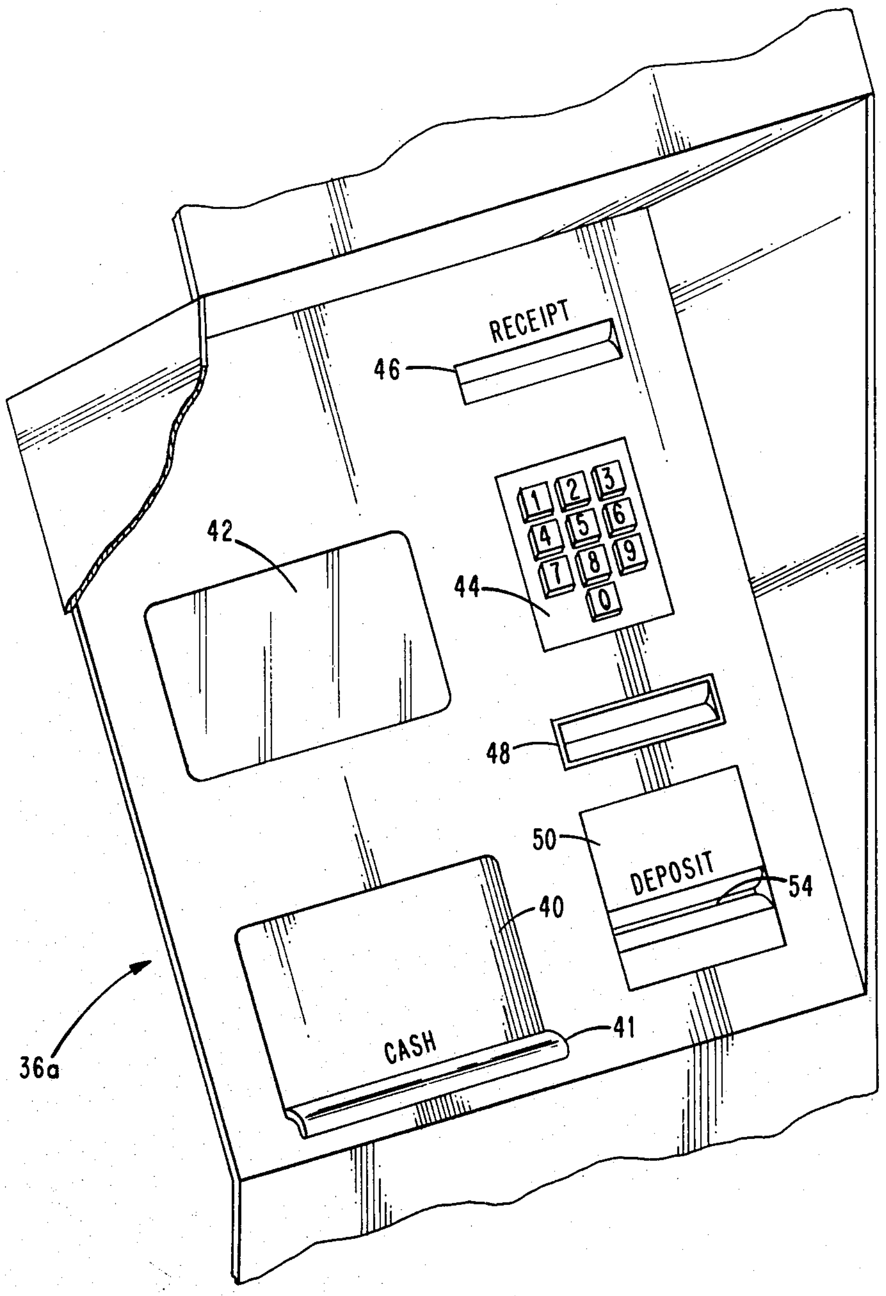
FIG. 1 is a perspective view, partially sectioned, of the customer or operator's panel which permits the operator to make a note dispensing request and to receive dispensed notes.

FIG. 1 shows the operator panel 36*a* which forms the customer or operator interface for the system of the invention. The panel includes a cash or note access door 40 which may be actuated by the operator by raising handle 41 to gain access to the note dispensing chamber to remove any cash or notes therein. An instruction screen 42, e.g., the face of a cathode ray tube (CRT), is controlled by the system to display step-by-step instructions for walking the operator through each transaction. A 10-key keyboard 44 provided on the panel 36*a* enables the operator to enter data which is required to request and complete the transaction. A slot 46 is provided for presenting a transaction receipt to the customer for those transactions which require a receipt. A further slot 48 is provided to enable the operator to insert his personal identification card into the panel, enabling a card reader located behind the panel to read the data on the card and feed it to the system in accordance with known system operation procedures. The operator panel also includes a depository station 50 including a deposit slot for receiving an envelope or envelopes inserted by the operator during deposit transactions.

In general, to operate the system, the operator inserts an identification card, which includes magnetically encoded data uniquely identifying the operator, into slot 48 of the operator's panel. The card reader alerts the system to the upcoming transaction and feeds the data on the card through the system to identify the operator. Thereafter, instructions are displayed on the screen 42 and the operator responds thereto by keying in his personal identification number (PIN) via keyboard 44. The PIN is compared with the data on the identification card to validate the transaction request. Thereafter, the operator utilizes the keyboard 44 to inform the system of the type of transaction desired, the amount involved, etc. When the transaction involves the delivery of cash, the system causes notes to be dispensed into the dispensing chamber located behind access door 40 and, when signalled by the system, the operator opens the door and removes the cash.

Figure 2:
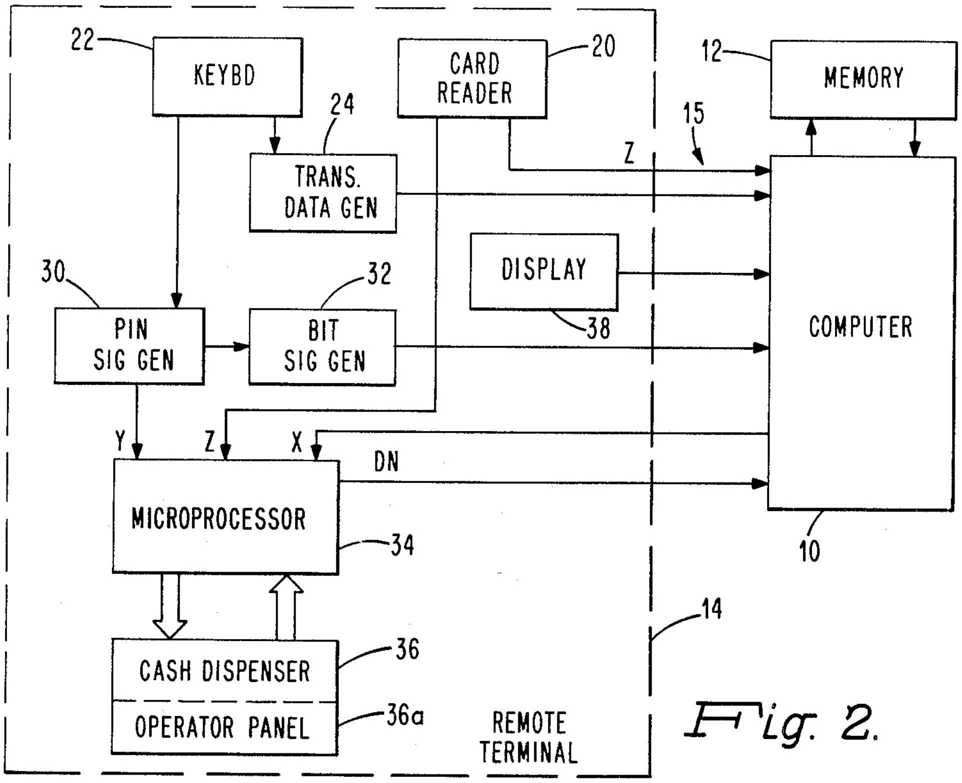
FIG. 2 is a schematic block diagram of a cash dispensing system incorporating the present invention.

A general block diagram of the overall system is shown in FIG. 2. The structure and operation of the system is described in detail in U.S. Pat. No. 4,075,460 issued to Richard A. Gorgens, which is incorporated herein by reference. In general, the system comprises a centralized computer 10 and memory unit 12 which is in communication via data lines 15 with a remote terminal 14 including a cash dispenser 36 and operator panel 36*a*. PIN data keyed into keyboard 22 by the operator is fed to a PIN signal generator 30 to generate a signal representative of a series of numbers entered by the operator, which signal is denoted by reference character Y.

A BIT signal generator 32 is responsive to PIN signal generator 30 to generate a signal representative of the number of bits in the PIN signal generated by signal generator 30. The BIT signal is transferred via one of the lines 15 to the computer 10. A transaction data generator 24 encodes transaction data entered into keyboard 22 and transmits it to the computer 10 via the lines 15. The magnetic card reader 20, which reads the data from the customer identification card inserted into slot 48 (FIG. 1), transmits the card data signal Z to the computer. The computer controls the display device 38 to display operator instructions appropriate to the type of transaction.

A security device, for example, microprocessor 34, receives the Y and Z signals from the signal generator 30 and card reader 20, respectively, and in addition receives an X signal from the computer 10 and, upon appropriate validation of all three signals as described in U.S. Pat. No. 4,075,460, issues a dispense signal to cash dispenser 36. This initiates a dispensing operation for dispensing the requested notes into the dispensing chamber associated with the operator panel 36*a*.

Figure 3:
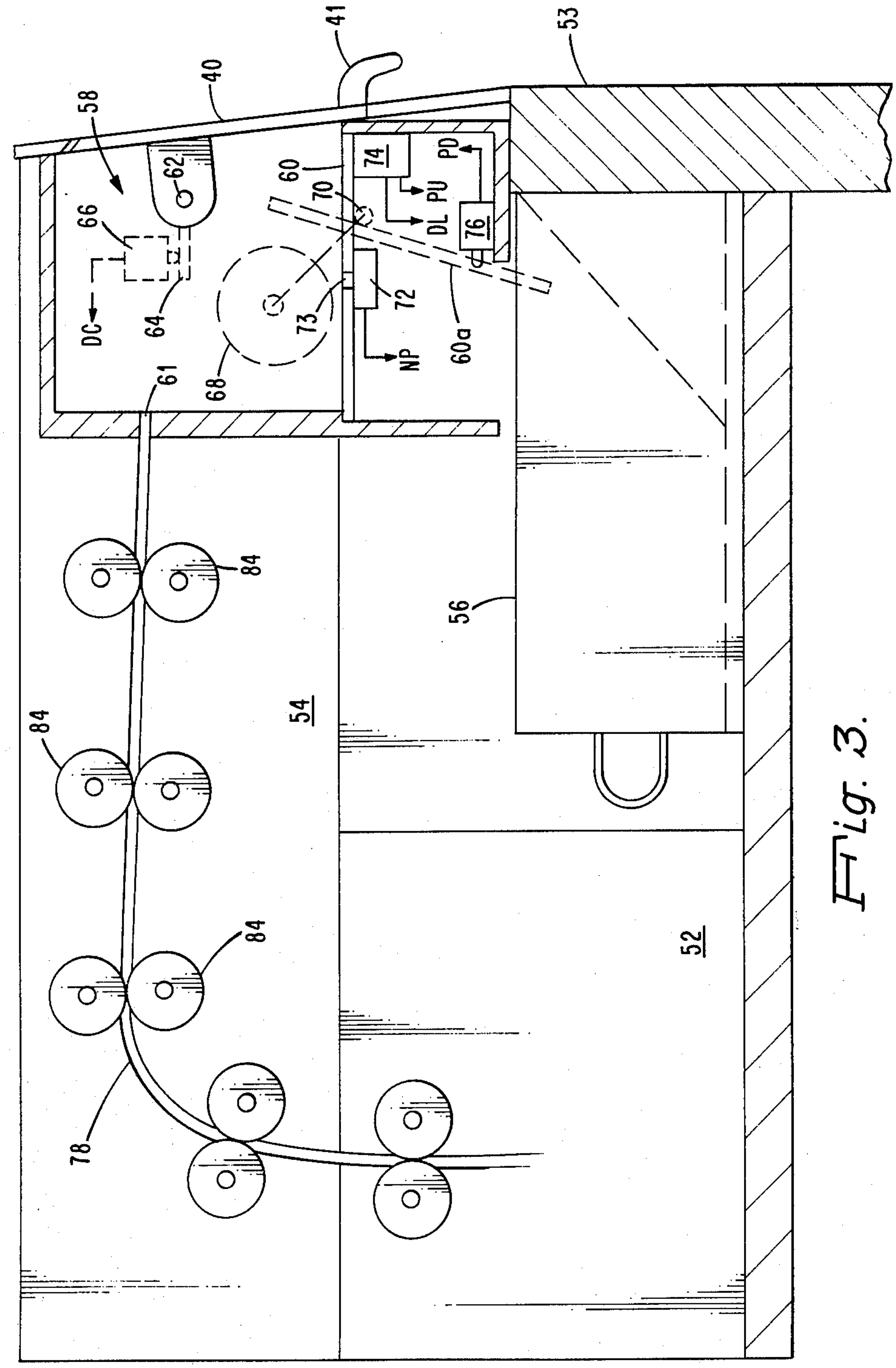
FIG. 3 is a cross-section view taken through the cash dispensing chamber associated with the panel of FIG. 1.

FIG. 3 illustrates the note dispensing system and dispensing chamber utilized in accordance with the invention. The dispensing system comprises a feed module 52, a transporter module 54, a purge bin 56, and a dispensing chamber 58. The feed module comprises conventional elements for storing a supply of notes and means for automatically feeding a particular number of notes on command from microprocessor 34 to the feed chute 78 provided in the transporter module 54. A plurality of feed rolls 84 are positioned along the chute 78 and function during a dispensing operation to feed a note or notes from the module 52 to the dispensing chamber 58. The entire dispensing apparatus is contained within a safe, the front wall of which is shown at 53.

As shown in FIG. 3, dispensing chamber 58 is positioned behind the access door 40 and receives dispensed notes through a slot 61. Dispensed notes fall to the bottom of the chamber and are received on a platform 60 comprising a flat rectangular plate. The access door 40 is pivotally mounted on the chamber sidewalls by means of a pair of stub shafts on either side of the door, one of which as shown as shaft 62 in FIG. 3.

Pivot shaft 62 includes a sensing arm 64 which is affixed to and rotates with the shaft. Arm 64 activates a sensing switch 66, such as a microswitch, whereupon a control signal DC is generated by the switch 66 indicating that the access door 40 is in the fully closed position as shown. Sensing arm 64 and switch 66 are located inside the area of the safe on the opposite side of the dispensing chamber wall so that they cannot be tampered with by a person outside the safe.

The platform 60, which forms the bottom surface of the dispensing chamber, is mounted on a pivot shaft 70 so that it can be pivoted to the opened position shown in dashed lines 60*a* in FIG. 3. A control motor 68, also located inside the safe area, is coupled, as by a gear train, to the shaft 70 and is operated by signals from microprocessor 34 in a manner to be described to tilt the platform 60 between the upper (closed) position shown in solid lines and the lower (open) position shown in dashed lines and back again for the purpose of purging the dispensing chamber of notes under predetermined purge conditions to be defined hereinafter.

A note sensing device 72 is provided on the underside of platform 60 and operates through an aperture 73 to sense the presence of a note on the platform. Sensing device 72 may, for example, be a photo-optical device which reflectively senses any object covering aperture 73. To this end the sensor projects a narrow beam of light through aperture 73 upward into the chamber 58. A light receiving aperture positioned immediately adjacent to the projecting aperture will collect radiation reflected from any object such as a bill or a note located immediately above it, i.e., on the platform 60. A photocell provided in sensor 72 senses the radiation and generates the output signal NP, indicating the presence of a note. When no note is present, no radiation is sensed and the signal NP assumes a different, i.e., lower, level. An alternative sensing technique would be to provide a reflective surface on the top wall of the chamber which would reflect a more intense projected beam of light back to the sensing aperture when no note was present in the chamber. Thus, in this latter case, the absence of reflected light, and thus the lower level of NP, would represent the note present condition in a manner opposite to the former arrangement.

A sensing and latching module 74 is affixed to the front wall of the apparatus just below the purge platform 60. Sensing and latching module 74 includes a sensing switch (not shown) similar to switch 66 for providing an output signal PU designating that the platform 60 is in the upper or closed position as shown in solid lines. Module 74 also includes a latching mechanism (also not shown) for locking access door 40 in the closed position and for generating an output signal DL indicating the latched condition. The latching mechanism may be, for example, a solenoid actuated latch bolt or similar device which is controllable for latching and unlatching the access door in response to remote signals from microprocessor 34. The signal DL may be generated by, for example, a microswitch similar to the switch 66 which is positioned to sense when the latching mechanism is in the latched condition. A further sensing switch 76 is provided on a flange below the platform 60 and operates to generate an output signal PD when the platform 60 is in its lower or open position, as illustrated by dashed lines 60*a* in FIG. 3.

A removable collection bin or tray 56 is positioned as shown in FIG. 3 below the dispensing chamber 58 to receive and retain any notes which are discharged from the chamber when the platform 60 is tilted to its lower position, in accordance with the operation of the invention as hereinafter described.

Figure 4:
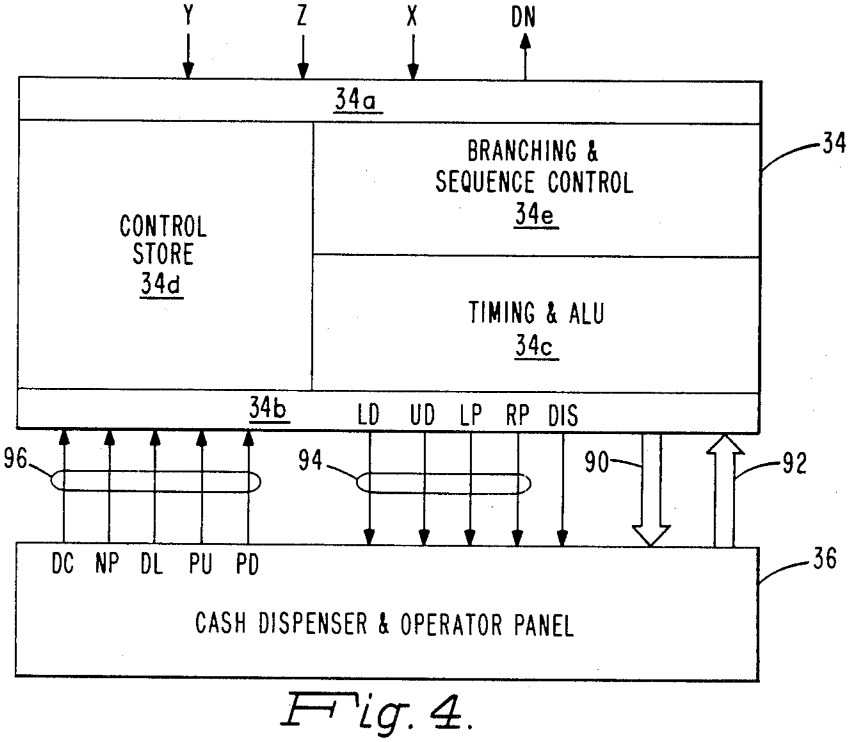
FIG. 4 is a schematic block diagram of the control microprocessor employed in the system to operate the cash dispenser and purge control.

FIG. 4 illustrates the interconnection between microprocessor 34 and the cash dispenser unit 36 insofar as operation of the present invention is concerned. The microprocessor 34 includes interface sections 34*a* and 34*b*, a timing and arithmetic logic unit 34*c*, a control store section 34*d*, and a branching and sequence control section 34*e*. The microprocessor may comprise, for example, a standard 8085 microprocessor chip module as manufactured by Intel Corporation. The microprocessor receives the X, Y, and Z signals from the computer 10, PIN signal generator 30, and card reader 20, respectively. If desired, these signals may be combined in a serial data stream, as in a communications link, rather than being transmitted on separate lines. The microprocessor generates an output signal DN which is transmitted to the computer 10 under certain conditions indicating that the terminal 14 requires manual intervention by a bank employee to service a condition which the system cannot automatically handle.

When microprocessor 34 determines, in response to the X, Y, and Z signals, that a cash dispensing operation is to be initiated, it transmits a DIS signal to the cash dispenser unit 36, triggering the latter to begin the feeding of bank notes from the storage module 52 to the dispensing chamber 58. Various additional signals associated with control of the note dispensing operation are transmitted between the cash dispenser and the microprocessor via lines 90 and 92. The specific control functions associated with these signals are not pertinent to the present invention and are not described herein.

Signals required for controlling the purge function in accordance with the present invention are transmitted from the microprocessor to the cash dispenser via lines 94 and from the cash dispenser to the microprocessor via lines 96. The latter signals include the door closed signal DC, the note present signal NP, the door latched signal DL, the platform up signal PU, and the platform down signal PD generated as previously described. The control signals generated by the microprocessor and transferred via lines 94 include a lock door signal LD, an unlock door signal UD, a lower platform signal LP, and a raise platform signal RP.

The lock door signal LD functions to activate the latching device in latching and sensing module 74 to latch the access door 40. The unlock door signal UD deactivates the latching device to unlatch the access door. Lower platform signal LP energizes motor 68 (FIG. 3) to tilt platform 60 in the counterclockwise direction until the platform down signal PD is generated. The raise platform signal RP energizes drive motor 68 in the opposite direction until the platform up signal PU is generated.

Figure 5:
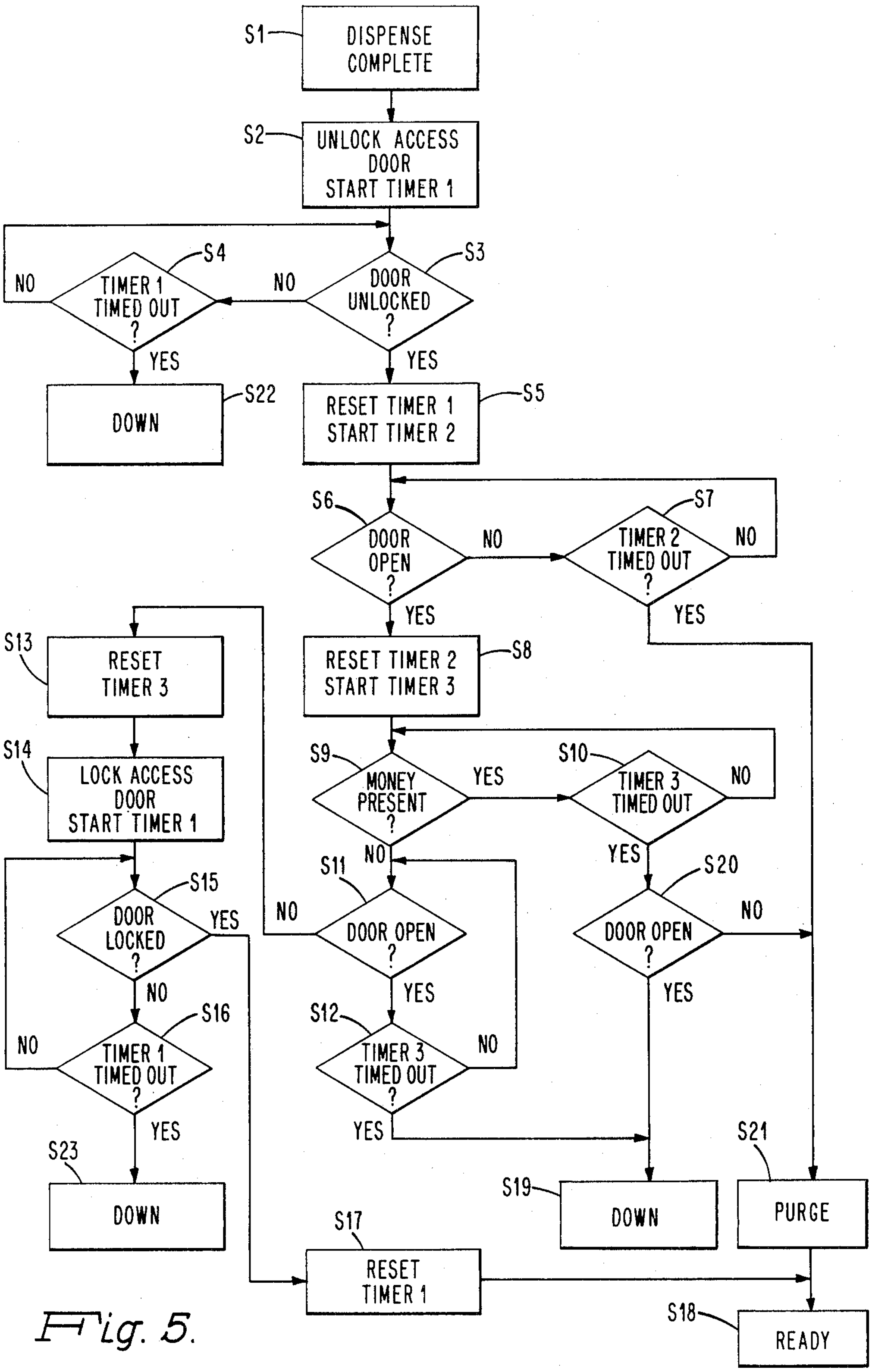
FIG. 5 is a flowchart diagram depicting control firmware stored in the microprocessor for operating the purge control of the present invention.
Figure 6:
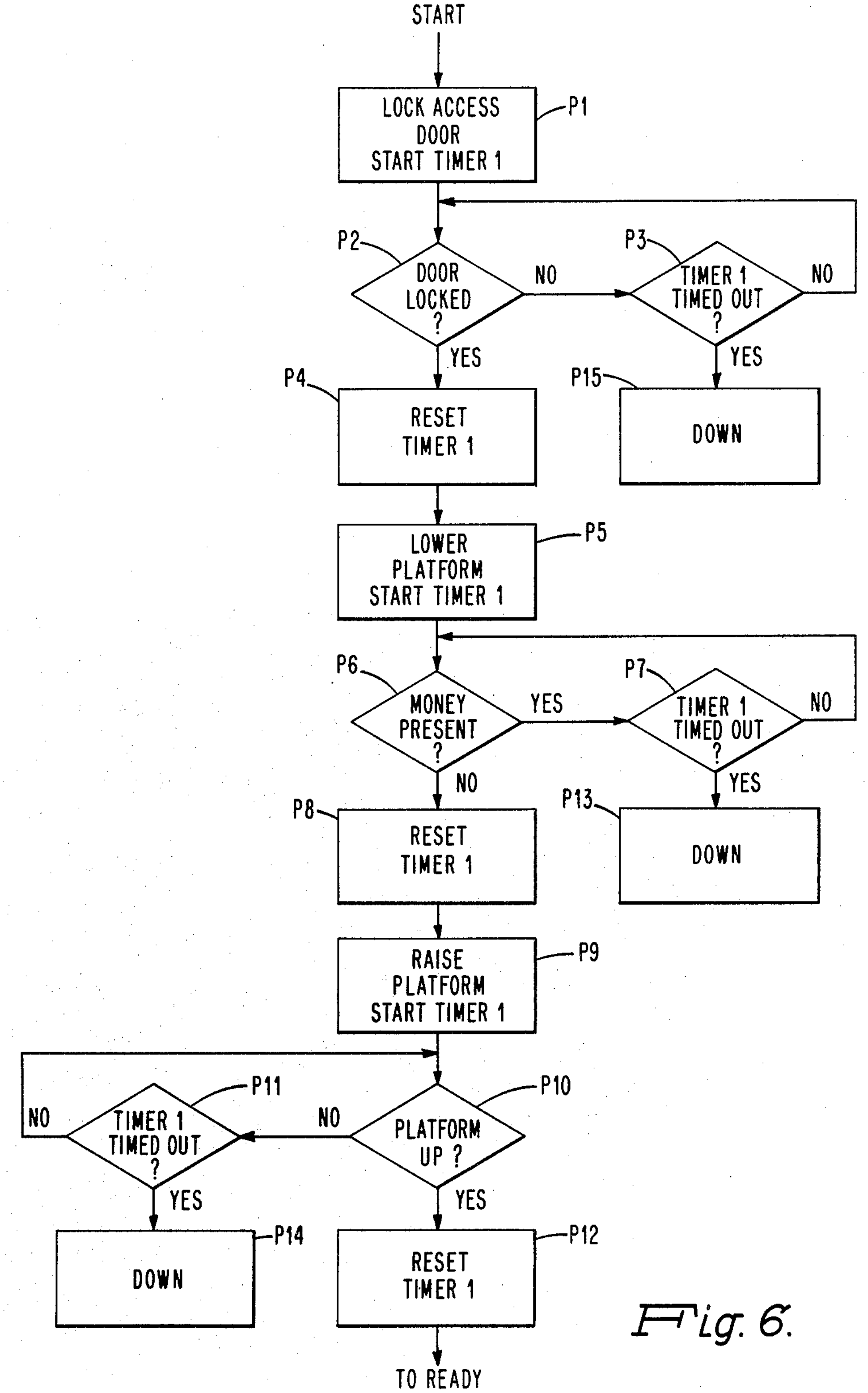
FIG. 6 is a flowchart diagram depicting additional firmware stored in the microprocessor for controlling the purge subroutine which is a part of the firmware depicted in FIG. 5.

Control of the system for effecting a purge operation is exercised by microinstructions stored in control store section **34*d* of the microprocessor. The microinstructions are represented by the flowchart diagrams of FIGS. 5 and 6. FIG. 5 shows the basic routine for controlling the portion of the note dispensing operation which permits the operator to open the access door and remove the dispensed notes. FIG. 6 represents the microinstructions employed in the purge subroutine wherein dispensed notes are discharged from the dispensing chamber 58** under specified purge conditions.

OPERATION

Referring to FIGS. 3, 5, and 6, operation of the automatic dispensing and purge control system of the invention is hereinafter described.

It can be assumed that during the first portion of the dispensing operation when notes are being fed through dispensing chute 78 into the chamber 58, the platform 60 is in its up position, and access door 40 is closed and latched (locked). Thus, the signals DC, DL, and PU will be supplied to the microprocessor from the cash dispenser unit. Since it is also assumed that notes have actually been delivered into the dispensing chamber, the note present signal NP will also be generated at this time.

When the microprocessor determines that the dispensing operation is completed, the microprogram advances from the dispense complete step S1 (FIG. 5) to step S2. This causes the microprocessor to issue control signal UD which is supplied to the cash dispenser unit and which deactivates the latching device in sensing and latching module 74, unlatching and thus unlocking the access door 40. Program step S1 also starts a timer 1, which is internally set up within microprocessor 34 and which may comprise, for example, a counter register in the ALU. The timing interval established by timer 1 is selected to reflect the normal time required for the various mechanical operations within the purge system to take place, i.e., the door locking and unlocking and the purge platform raising and lowering operations.

The program thereafter advances to step S3, Door Unlocked?, in which the signal DL is tested to determine whether the unlocking operation has occurred. Initially, DL will indicate the continued presence of the latched condition, so the program branches to step S4 where the state of timer 1 is tested. If the timer has not timed out, the program loops back to step S3. The program continues to traverse the S3–S4 loop until either DL indicates that the door is unlocked or timer 1 times out. If the latter occurs first, step S22 is entered, signalling that an unresolvable problem has been encountered and that the dispensing apparatus should be shut down. This causes the microprocessor to issue the signal DN to the computer 10, whereupon the latter provides an indication that the terminal 14 requires operator attention and all further dispensing commands are inhibited.

However, if in step S3 the signal DL indicates that the access door 40 is unlatched normally, the program takes the Y exit from step S3 and advances to step S5 whereupon timer 1 is reset and a timer 2 is started. The interval set by timer 2 establishes a time window during which the operator who has requested the note dispensing operation must open access door 40.

After the start of timer 2, the program advances to step S6 and thereafter branches to step S7, whereupon it loops back to S6. The timing loop including steps S6 and S7 continues to be traversed until either the access door is opened or timer 2 times out. In the case where the access door is opened before the timer times out, the program takes the Y exit from branching step S6 and advances to step S8, whereupon timer 2 is reset and a timer 3 is started. The interval established by timer 3 defines the length of time which an operator would normally take to remove the notes from the dispensing chamber, once the access door is opened.

The program advances immediately from step S8 to S9, which is a branching step in which the NP control signal from the cash dispenser unit is tested. The program branches through S9 to step S10, loops back to step S9 and continues to traverse the S9–S10 loop unti either the signal NP indicates that no note is present in the dispensing chamber or the timer 3 times out. If the notes are removed from platform 60 before timer 3 times out, the program advances through the N exit from branch S9 and enters branching step S11, whereupon the control signal DC is tested to determine whether access door 40 is closed.

The S11–S12 loop is traversed until either the signal DC indicates that the access door has been closed or timer 3 times out. If the access door is closed before timer 3 times out, the program takes the N exit from step S11 and advances to step S13 in which the timer 3 is reset. Thereafter, step S14 is executed to lock access door 40 and restart timer 1. This causes the microprocessor to issue the LD control signal to the cash dispenser unit to energize the latching device in module 74 to engage the door latch and lock the door 40. The program next enters step S15 whereupon the control signals DC and DL are tested to determine if the door is actually locked. These signals must both be present to indicate that the door is locked. The program traverses the S15–S16 loop until either the locking state is established or until timer 1 times out. If the door locks normally, the program exits step S15 through the Y branch and enters step S17, resetting timer 1. Thereafter the program proceeds to step S18, signalling the microprocessor that the dispensed notes have been removed in the normal fashion, that the access door has been locked, and that the system is in condition to perform another dispensing operation.

If in step S15 the signal DC continues to indicate that the door is not closed or the signal DL continues to indicate that the latch is not engaged prior to the time timer 1 times out, the program takes the Y exit from step S16 and executes Down step S23, whereupon the microprocessor issues the DN signal to computer 10, inhibiting further dispensing operations until the locking failure situation is resolved through operator intervention.

If, during the time that the program was traversing the S6–S7 timing loop, timer 2 times out before the control signal DC indicates that the access door is open, the program takes the Y exit from step S7 and executes the pruge subroutine of step S21 to discharge any notes that may be present in the dispensing chamber into the purge bin 56. Likewise, if during the time that the program is traversing the S9–S10 timing loop, timer 3 times out before the NP signal indicates that the notes have been removed from the platform 60, the program takes the Y branch out of step S10 and enters the purge routine S21 through branching step S20. The purge is executed only if the access door is closed as determined in step S20 by testing the signal DC.

If the door is not closed, the program branches to Down step S19 and the dispensing system is shut down to await operator intervention. Down step S19 is also executed in the event that the program exits from timing loop S11–S12 via branch Y of step S12. This occurs if the access door is not closed within the period of timer 3.

The purge subroutine S21 is depicted in the flowchart diagram of FIG. 6. The first step in the subroutine, P1, functions to lock access door 40 and start timer 1. The steps P1, P2, P3, and P15 operate identically to the previously described locking steps S14, S15, S16, and S23 to either confirm the locking of the access door or to cause the issuance of a DN signal from the microprocessor to inhibit further dispensing operations until the unlocked door condition is resolved by operator intervention.

After the access door is locked, the purge program advances to step P4 to reset timer 1 and thence to step P5, whereupon the microprocessor restarts timer 1 and issues the control signal LP to activate platform control motor 68. This causes purge platform 60 to be driven counterclockwise to dump any notes thereon into the purge bin 56. This dump operation is monitored by the timing loop comprising steps P6–P7 such that if a note is still detected on the platform when timer 1 times out, the system executes step P13 and shuts down. If the purge is successful, the timing loop is exited through branch N of step P6 and step P8 is executed to reset timer 1.

Thereafter, the program advances to step P9, whereupon timer 1 is restarted and the control signal RP is issued by the microprocessor. This reverses motor 68 and drives the purge platform 60 is a clockwise direction until the signal PU is produced by the sensing module 74. If this does not occur before timer 1 times out, timing loop P10–P11 is exited via branch Y of step P11 and the system shuts down via step P14, whereupon the DN output is produced by microprocessor 34 inhibiting further operation of the dispensing system until operator intervention resolves the situation.

If platform 60 closes normally, the program takes exit Y from step P10 and executes step P12 which resets timer 1. Thereafter, the program proceeds to READY step S18 of the main program, thus signalling the completion of the purge operation and indicating that the system is in condition to handle further dispensing operations.

Thus, reviewing the above operations, it is seen that the system of the invention provides a purge control for discharging notes which have been dispensed into an operator accessible dispensing chamber if the access door to the chamber is not operated within a set period of time following the dispensing operation. Furthermore, if the access door is opened but a dispensed note or notes are left in the chamber after a predetermined period of time following the opening of the door, the purge control system also operates to discharge the remaining notes from the chamber before further operation of the dispensing system is permitted.

The purge control thus prevents a situation in which notes inadvertently or erroneously left in the dispensing chamber become accessible to an unauthorized operator.

Furthermore, the interlocks provided on the purge apparatus inhibit continued operation of the dispensing system if a note or other object remains in the dispensing chamber, even after the platform 60 is actuated, or if the platform fails to close properly after a purge cycle is executed.

Thus, in summary, it is seen that in accordance with the invention described herein, a purge control apparatus is provided for a note dispensing system including means for dispensing a note into a dispensing chamber and operator-actuatable access means for permitting an operator to gain access to the chamber to remove the note. As illustrated in the examplary embodiment hereinabove described, the means for dispensing includes the feed module 52, transporter module 54 (FIG. 3) and the controls therefor which may, for example, include the operator panel 36*a* and microprocessor 34. The operator-actuatable access means is represented by the chamber access door 40 which may be opened by an operator to gain access to the dispensing chamber 58.

Further in accordance with the invention the system incorporates means for disabling the access means to prevent actuation thereof, whereby the operator is denied access to the chamber and means for discharging a note from the chamber after the access means is disabled. As illustrated in the exemplary embodiment hereinabove described, the means for disabling is represented by the latching mechanism 74 and controls therefor which lock the access door to prevent the operator from gaining access to the dispensing chamber. The means for discharging is represented by the purge platform 60 and tilt motor 68, along with the controls related thereto.

Further in accordance with the invention, as hereinabove described, note sensing means are provided for sensing the presence of a note in the dispensing chamber and control means responsive to the note sensing means after the operation of the discharging means are provided to produce a purge complete indication if the note sensing means does not indicate the presence of a note in the chamber.

As illustrated in the exemplary embodiment hereinabove described, the note sensing means includes the sensing device 72 and the control means is represented by the portion of the control microprogram including those instructions which implement the program steps P6, P8, P9, P10, and P12 (FIG. 6).

Furthermore, in accordance with another aspect of the invention described herein, a purge control apparatus is provided for a note dispensing system including means for dispensing a note into a dispensing chamber, including movable platform means within the chamber for receiving a dispensed note and means for moving the platform means to discharge the note from the chamber in response to a purge signal from the system and for restoring the platform to its initial position.

As illustrated in the exemplary embodiment hereinabove described, the dispensing means is represented by the transporter module 54 (FIG. 3) and the controls associated therewith and the movable platform means is represented by the purge platform 60, while the means for moving the platform means includes the motor 68 and controls associated therewith.

Further in accordance with this aspect of the invention the system incorporates sensing means for sensing the position of the platform and for providing a return indication when the platform has been restored to its initial position and means responsive to the sensing means for inhibiting further operation of the dispensing means until the return indication is provided. As illustrated in the above-described exemplary embodiment, the sensing means is represented by the sensing switch within module 74 which provides the platform up signal PU, and may additionally be represented by sensing switch 76 which provides the platform down signal PD. The PU signal is generated when the platform is restored to its initial (up) position.

The means responsive to the sensing means for inhibiting further operation of the dispensing means is represented by the portion of the control microprogram including the instructions which implement the program steps P10, P11, and P14 which operate to inhibit further operation of the dispensing means until the PU signal is generated.

If will be apparent to those skilled in the art that various modification and variations could be made to the embodiment of the invention as hereinabove described without departing from the spirit and scope of the invention.

What is claimed is:

1. A note dispensing system comprising, in combination:

an operator panel including means for allowing an operator to request a note dispensing operation;

a dispensing chamber adjacent to said panel having an access door by which said operator can gain access to said chamber;

means for dispensing at least one note into said chamber in response to a dispensing operation request;

a tiltable plate positioned to receive said note when it is dispensed into said chamber;

security means including means for locking said access door prior to a discharging of said note from said chamber and during a note dispensing operation, and means for unlocking said door upon completion of said operation to permit said operator to open said door to remove said note;

timing means responsive to a lock control signal received from said security means for indicating the occurrence of a set period of time following the unlocking of said door by said security means;

means for tilting said plate to allow gravity to discharge said note from said chamber if said door is not opened within said set period of time; and means for restoring said plate to its original non-tilted position and for providing an output signal indicative thereof to condition said system for further operation of said dispensing means.

2. Purge control apparatus for a note dispensing system including means for dispensing a note into a dispensing chamber, comprising:

movable platform means within said chamber for receiving a dispensed note;

means for moving said platform means to discharge said note from said chamber in response to a purge signal from said system and for restoring said platform to its initial position;

sensing means for sensing the position of said platform and for providing a return indication when said platform has been restored to its initial position; and means responsive to said sensing means for inhibiting further operation of said dispensing means until said return indication is provided.

3. The apparatus set forth in claim 2 wherein said movable platform comprises a tiltable plate and said means for moving comprises means for tilting said plate to allow gravity to discharge said note from said chamber.

4. The apparatus set forth in claim 3 further comprising:

return means included in said tilting means for returning said plate to its original position after it has been tilted;

timing means for generating a timeout signal if said sensing means fails to produce said return indication within a predetermined period of time following the actuation of said return means; and means responsive to said timeout signal for disabling further operation of said dispensing means.

5. A note dispensing system including means for feeding a note into a dispensing chamber in response to a note dispensing request and operator actuatable access means for permitting an operator to gain access to said chamber to remove said note, and means for purging a dispensed note from said chamber in response to a purge condition comprising, in combination:

means responsive to said purging means for disabling said access means to prevent actuation thereof, whereby said operator is denied access to said chamber;

means for reactivating said feeding means after said access means is disabled to dispense any note still present in said feeding means;

a movable platform within said chamber for receiving a dispensed note;

discharging means responsive to said purging means and operable after said reactivation operation for tilting said plate to allow gravity to discharge said note from said chamber;

position sensing means for sensing the position of said platform and for providing an indication that said platform is in a non-tilted position; and means for inhibiting operation of said means for reactivating said feeding means until said indication is provided, whereby operation of said discharging means is prevented unless said plate is in a non-tilted position.

6. The note dispensing system set forth in claim 5 further comprising means for disabling further operation of said note dispensing system in response to continued absence of said indication that said plate is in a non-tilted position.

7. A note dispensing system including means for dispensing a note into a dispensing chamber and operator-actuatable access means for permitting an operator to gain access to said chamber to remove said note, means for purging a dispensed note from said chamber in response to a purge condition comprising, in combination:

means for disabling said access means to prevent actuation thereof, whereby said operator is denied access to said chamber;

means for discharging said note from said chamber after said access means is disabled;

note sensing means for sensing the presence of a note in said chamber; and control means responsive to said note sensing means after the operation of said discharging means for issuing a purge complete indication if said note sensing means does not indicate the presence of a note in said chamber and reactivating said discharging means if said note sensing means does indicate the presence of a note in said chamber.

8. The note dispensing system set forth in claim 7 further comprising means for inhibiting further operation of said note dispensing system if said note sensing means continues to indicate the presence of a note in said chamber after said discharging means is reactivated by said control means.

9. The note dispensing system set forth in claim 7 wherein said discharging means comprises:

a movable platform within said chamber for receiving a dispensed note; and means for moving said platform to discharge said note from said chamber.

10. The note dispensing system set forth in claim 9 wherein said movable platform comprises a tiltable plate and said means for moving comprises means for tilting said plate to allow gravity to discharge said note from said chamber.

11. The note dispensing system set forth in claim 10 wherein said means for tilting said plate includes return means for returning said plate to its original position and wherein said system further comprises:

position sensing means for sensing the position of said plate and for providing a return indication when said plate has been returned to its original position; and means responsive to said position sensing means for inhibiting operation of said control means until said return indication is provided, whereby said purge complete indication is provided only if said plate is returned to its original position.

12. The note dispensing system set forth in claim 11 wherein said means responsive to said position sensing means further includes:

means responsive to the absence of said return indication for reactivating said return means; and means responsive to the continued presence of said return indication after said reactivation of said return means for disabling further operation of said dispensing means.

* * * * *